(12) United States Patent
Ostrovsky

(10) Patent No.: US 7,644,037 B1
(45) Date of Patent: Jan. 5, 2010

(54) METHOD AND SYSTEM FOR TRANSFERRING ELECTRONIC FUNDS

(76) Inventor: Vladimir Ostrovsky, 5 Taylor Dr., Closter, NJ (US) 07629

( * ) Notice: Subject to any disclaimer, the term of this patent is extended or adjusted under 35 U.S.C. 154(b) by 1619 days.

(21) Appl. No.: 09/524,281

(22) Filed: Mar. 13, 2000

(51) Int. Cl.
*G06Q 40/00* (2006.01)
(52) U.S. Cl. .......................................... 705/40; 705/30
(58) Field of Classification Search .............. 705/10–44
See application file for complete search history.

(56) References Cited

U.S. PATENT DOCUMENTS

| | | | |
|---|---|---|---|
| 4,960,981 A | | 10/1990 | Benton et al. |
| 5,175,416 A | * | 12/1992 | Mansvelt et al. ............ 235/379 |
| 5,465,206 A | | 11/1995 | Hilt et al. |
| 5,590,196 A | | 12/1996 | Moreau |
| 5,649,117 A | | 7/1997 | Landry |
| 5,659,165 A | | 8/1997 | Jennings et al. |
| 5,677,955 A | * | 10/1997 | Doggett et al. ................ 705/76 |
| 5,699,528 A | | 12/1997 | Hogan |
| 5,745,886 A | | 4/1998 | Rosen |
| 5,757,917 A | | 5/1998 | Rose et al. |
| 5,825,003 A | | 10/1998 | Jennings et al. |
| 5,826,241 A | | 10/1998 | Stein et al. |
| 5,845,265 A | | 12/1998 | Woolston |
| 5,848,400 A | | 12/1998 | Chang |
| 5,870,473 A | | 2/1999 | Boesch et al. |
| 5,884,288 A | * | 3/1999 | Chang et al. .................. 705/40 |
| 5,884,290 A | | 3/1999 | Smorodinsky et al. |
| 5,897,621 A | | 4/1999 | Boesch et al. |
| 5,913,203 A | | 6/1999 | Wong et al. |
| 5,920,847 A | | 7/1999 | Kolling et al. |
| 5,956,700 A | * | 9/1999 | Landry ........................ 705/40 |

(Continued)

FOREIGN PATENT DOCUMENTS

JP     360079466 A    *   5/1985

(Continued)

OTHER PUBLICATIONS

Knowles, Anne, Rival transaction models emerging: on-line authentication schemes check credit cards or users to ensure security; PC Week, Mar. 27, 1995, vol. 12, No. 12, ISSN: 0740-1604.

(Continued)

*Primary Examiner*—Frantzy Poinvil
(74) *Attorney, Agent, or Firm*—Hunton & Williams LLP

(57) ABSTRACT

A method and system for transferring electronic funds over the Internet wherein a sender provides payment information to a transfer processing system. The sender may choose from a plurality of different types of funds transfer, such as wire transfer, Western Union money transfer, various types of checks, and transfers to ATM debit/credit cards. The transfer processing system sends an electronic payment message to a recipient indicating the transfer of funds and a transfer message to a financial institution providing instructions to debit the sender's account and make those funds available to the recipient. If the recipient has an account with a financial institution that is affiliated with the transfer processing system of the present invention, the funds are credited to the recipient's account wherein the payment message serves as a confirmation message. If the recipient does not have such an account, the recipient may access the transfer processing system to access the funds made available by the system wherein the payment message serves as a payment availability message.

44 Claims, 16 Drawing Sheets

U.S. PATENT DOCUMENTS

| | | | |
|---|---|---|---|
| 5,963,647 A * | 10/1999 | Downing et al. | 705/39 |
| 6,039,250 A | 3/2000 | Ito et al. | |
| 6,041,315 A * | 3/2000 | Pollin | 705/45 |
| 6,070,150 A * | 5/2000 | Remington et al. | 705/34 |
| 6,122,625 A * | 9/2000 | Rosen | 705/65 |
| 6,227,447 B1 | 5/2001 | Campisano | |
| 6,243,689 B1 * | 6/2001 | Norton | 705/18 |
| 6,260,024 B1 * | 7/2001 | Shkedy | 705/37 |
| 6,341,724 B2 | 1/2002 | Campisano | |
| 6,360,252 B1 * | 3/2002 | Rudy et al. | 709/206 |
| 6,480,885 B1 * | 11/2002 | Olivier | 709/207 |

FOREIGN PATENT DOCUMENTS

| | | |
|---|---|---|
| WO | WO 00/67177 | 11/2000 |

OTHER PUBLICATIONS

Cox, Benjamin, Tygar, J.D., Sirbu, Marvin, NetBill Security and Transaction Protocol; Carnegie Mellon University, Pittsburgh, PA.

Internet Providers Take Next Step Toward Electronic Commerce, Electronic Marketplace Report, Dec. 20, 1994.

Sirbu, Marvin A., Internet Billing Service Design and Prototype Implementation; p. 1-19.

Carnegie Mellon University Information Networking Institute, NetBill 1994 Prototype, Master Science in Information Networking; p. i-xi and p. 1-91.

NetBill: An Internet Commerce System Optimized for Network Delivered Services.

Hamilton, Annette, The check's in the mail . . . maybe; ZDNet News, Mar. 26, 2000; p. 1-2.

PayPal.com Case Study; p. 1-7.

PayPal "Instant Money. Anytime. Anywhere."; 1999; p. 1.

PayPal—About; 2000, p. 1.

Welcome to PayPal.com; 2000, p. 1.

Confinity, Inc.; 1999, p. 1.

PayPal "Instant Money. Anytime. Anywhere:faq."; 1999, p. 1-6.

PayPal "Instant Money. Anytime. Anywhere:About"; 1999, p. 1.

TheStandard.com: Great X-pectations; Feb. 28, 2000, p. 1-3.

Barnett, Megan, TheStandard.com: Great X-pectations; Feb. 28, 2000, p. 1-3.

PayPal-News; http://www.andrys.com/paypal.html, p. 1-3.

Haskin, David, The Real Net Device Killer Apps; Aug. 2, 1999, p. 1-2.

Wireless Handheld Payment Site Released; Nov. 22, 1999, p. 1-2.

Hartill, Lane, How to handily beam your greenbacks; Nov. 4, 1999, p. 1-2.

Raik-Allen, Georgie, Investors beam funding to Confinity; Jul. 23, 1999, p. 1-2.

Bill Payment Via Palm VII Enabled; Aug. 4, 1999, p. 1-2.

Arar, Yardena, Beam Me Up Some Money, Scotty; PC World; Nov. 15, 1999, p. 1-2.

Haskin, David, Nokia Invests In Net Device Payment Technology; Jul. 23, 1999, p. 1-2.

* cited by examiner

Date: 01 November 1999   Time: 05:41 PM
From: Bob Smith
To: Greenlawns@ibq.com
CC: edgeorge@greenlawns.com
Subject: payment for lawn service
File Attachment: lawn.doc   Browse......
Amount: 50   USD ▼      IBQ/E-Mail Transfer ▼

Here is fifty dollars for mowing my yard.

Send now

Figure 7a

NEW MESSAGE

Date: 01 November 1999    Time: 06:12 PM
From: Bob Smith
To: Joejones@Greenlawns.com
CC: edgeorge@Greenlawns.com
Subject: payment for lawn service
File Attachment: lawn.doc | Browse......
Amount: 50 | USD ▼    IBQ/E-Mail Transfer ▼

Here is fifty dollars for mowing my yard - great job!!

[Send now]

| | |
|---|---|
| From: | Bob Smith [SMTP:BobSmith@ibq.com] |
| Sent: | Monday, November 01, 1999 11:11 AM |
| To: | JoeJones@GreenLawns.com |
| Subject: | Get your transferred money from www.ibq.com |

Bob Smith <BobSmith@ibq.com> has sent you 50 USD using the IBQ system. Your reference number is 230001. To access the money sent to you, enter http://www.ibq.com and register on the IBQ system --------->

The body of the original message: <-------Here is fifty dollars for mowing my yard - great job!! --------->

File Attachment:

FIG. 8a

Money Transfer Person-to-Person

Transactions from specified IBQ.COM account

In order to get your transfer You should fill out the fields below with correct information.

Sender Information (from your e-mail)

Nick name: Bob Smith             Reference #: 230001

Authentication password (provided by sender)

Password: 251xyk

---

[ Get Money ]   [ View Transactions ]

Figure 8b

Quick Cash Money Transfer

Date: 01 November 1999  Time: 05:45 PM
From: Karen Brown
To: Anna Scott@frenchcards.com
CC:
Subject: greeting card payment
File Attachment: invoice.doc | Browse......
Amount: 600 | FR Francs Quick Cash It's a pleasure doing business with you.

Name of a person picking up the funds:

*First: Anna                                    *Last: Scott

Destination:
*City: Paris                                    Province/State:
*Country: France Test question:
Additional Service
The receiver will have to give a correct answer in order to get the money. You will have to provide us with a question and an answer (which we will consider to be a correct one):

Question: What is my favorite painting?

Answer: Water Lillies

Send now

Figure 9

Application Form For Cheque Issuing

Date: 01 November 1999  Time: 05:45 PM
From: Sam Woods
To: Lisa Bradley@EdgarBradley.com
CC:
Subject: furniture order
File Attachment: order.doc  Browse......
Amount: 18,436.20  USD ▼

Cheque ▼

Please rush this order. Call me at 555-1234 Monday morning to discuss bar stools. Thanks!

Account info

*Pay to the order of: Edgar Bradley Furniture

*Address: Raleigh, North Carolina

Memo: furniture order for Sam's Restaurant

Check delivery

*Mail Address: 1800 Parkview Avenue
Raleigh, North Carolina 27601

Type of delivery: DHL ▼

[Send now]

Figure 10

Money Transfer Order

Date: 01 November 1999    Time: 05:45 PM
From: Tony Martin
To: Dave&Tom@eshirts.com
CC:
Subject: investment
File Attachment: order.doc    Browse......
Amount: $20,000    USD Wire Transfer Provide me details of your meeting with the other inventors.

Intermediary bank

| | |
|---|---|
| Swift: | XX |
| BLZ: | YY |
| ABA: | ZZ |
| Transit: | QQ |

| | |
|---|---|
| Bank Name: | Crestar |
| Address: | 1200 State Avenue San Francisco, CA 94101 |

Beneficiary bank

| | |
|---|---|
| Swift: | XXX |
| BLZ: | YYY |
| ABA: | ZZZ |
| Transit: | QQQ |

| | |
|---|---|
| *Corr. Account | 1874 2698 |
| *Bank Name: | Nation's Bank |
| Address: | 440 Bank Street Cleveland, Ohio 44101 |

Beneficiary

| | |
|---|---|
| *Account: | 2258 6472 1002 |
| *Name | Dave Montgomery |
| Address: | PO Box 187 Cleveland, Ohio 44101 |

Details of payment

Type of payment: Normal    Charges: Our
Value date: 01 Nov 1999

Figure 11a

Information to bank
Information to bank: 
Confirmation of payment
Confirmation of payment: 
Figure 11b

METHOD AND SYSTEM FOR TRANSFERRING ELECTRONIC FUNDS

FIELD OF INVENTION

The present invention relates to the field of electronic funds transfer via the Internet wherein a sender provides payment information to an on line transfer processing system which sends an electronic payment message to a recipient indicating the transfer of funds and a transfer message to a financial institution that debits the sender/payor's account and makes those funds available to the recipient. The receipt of the electronic payment message from the sender unequivocally informs the receiver that funds have been successfully transferred and are available for withdrawal or other transactions.

BACKGROUND OF THE INVENTION

In a typical financial transaction, a payor transfers funds to a payee through one or more financial institutions. Generally, the transaction involves a payor who submits a request to his or her bank to transfer a specific amount of funds to a payee's account. The payor's bank debits the payor's account and contacts the payee's bank. The payee's bank then credits the payee's account with funds from the payor's account. Finally, the funds are made available to the payee for withdrawal. However, this process usually takes several days or weeks to complete. In other words, the funds are not available to the payee for an extended period of time after the transaction has been initiated. The typical funds transfer process unnecessarily delays business transactions. This is particularly fatal for Internet businesses where speed and availability of funds are essential. Another problem arises when the transaction is not executed properly due to security problems or errors in entering multiple identification codes. These and related problems further prolong the transaction process and delay fund availability.

International transfer of funds is especially complicated because of various government regulations and the use of different currencies. International transfer of funds requires the payor to obtain the relevant exchange rate in order to calculate the equivalent value of the foreign currency. The rate of exchange is not always available to the payor. This lack of important information generally delays international funds transfers.

The Internet has provided numerous opportunities for purchasers to browse and shop on line. In particular, the Internet has made buying and selling goods, information and services increasingly easy, convenient and affordable. The opportunities to buy and sell over the Internet are vast and plentiful, however, a system and method of payment that complements the speed and convenience of the Internet has yet to be implemented.

These and other drawbacks exist with current systems.

SUMMARY OF THE INVENTION

An object of the present invention is to overcome these and other drawbacks with existing systems.

It is an object of the present invention to provide a system and method for transferring funds over the Internet wherein a sender provides payment information to a transfer processing system wherein the transfer processing system sends a payment message to a recipient indicating the transfer of funds and a transfer message to a financial institution that debits the payor's account and makes those funds available to the recipient.

It is another object of the present invention to provide a system and method of funds transfer over the Internet wherein a payment message indicating information of funds transfer is sent to an electronic address of a payee where the payment message may be sent by email, AOL Instant Messenger™, NetMeeting™, Microsoft Chat™, ICQ™, Netscape Messenger™, or other electronic communication methods wherein receipt of the message by the payee informs the payee that funds have been or are in the process of being transferred and are or will shortly be available for withdrawal or other transactions. The payment message may also be sent as a text message to a cell phone.

It is another object of the present invention to transfer funds over the Internet to a recipient's account with an IBQ financial institution's transfer processing system where receipt by the recipient of a payment message informs the recipient that funds have been successfully transferred.

It is another object of the present invention to transfer funds over the Internet to a recipient who does not have an account through use of a financial institution's online transfer processing system where receipt of a payment message by the recipient informs that recipient that funds are available for withdrawal once the recipient establishes communication with the financial institution's online transfer processing system over the internet. In this situation, the sender may convey a password to a recipient through a separate method of communication where the password allows the recipient to gain access to the funds transferred and made available through the transfer processing system.

It is another object of the present invention to transfer funds over the Internet where a payor's personal account number is not conveyed, a payee's personal account number is not required, and funds may be conveyed anonymously.

It is another object of the present invention to provide a system and method of funds transfer over the Internet where the payee may automatically redirect funds received from the payor to a second payee without even opening an account with the fund transfer system.

The present invention provides a system and method of funds transfer over the Internet where security measures are implemented to ensure safe and confidential transfer of funds. Users may transfer funds through various methods including email transfers, wire transfers, electronic checks, certified checks, conventional checks, Western Union money transfer, transfers to ATM debit/credit cards, letters of credit, buy/sell securities, stop payment orders, and other types of transactions.

A payor system enters payment information to a transfer processing system such as an IBQ Server™ developed according to the present invention through the Internet. The transfer processing system (e.g., IBQ Server) verifies that the payor system has the requisite amount of money in a specified payor's account in a financial institution associated with that transfer processing system to make the desired transfer. Communication between the transfer processing system and the payor's financial institution may occur to exchange account information. Transfer processing system sends a transfer message to the payor's financial institution and simultaneously sends a payment message to the payee. The payment message may contain information regarding the funds transfer.

When the payee system receives the payment message over the Internet, the payee system is notified of the availability of funds where the funds may be (1) transferred into the payee system's account where the payee system's bank is a member of the transfer processing system or (2) made available to the payee system by establishing a connection with the transfer processing system where the funds may be redirected as desired by the payee system. The receipt of a payment message from a payor system through a transfer processing system to a payee system indicates that (1) the payee has received the funds in an account with the transfer processing system of the present invention or (2) money transfer has been successfully initiated and funds are or will be available for withdrawal or further funds transactions through the transfer method selected by the payor. A payor system may include an individual, a group of individuals, a company, a merchant, or any other entity that may need to make a payment. Likewise, a payee system may include an individual, a group of individuals, a company, a seller of goods or services, or any other entity that may receive a payment. Thus, individuals or other entities may transfer funds while sending messages over the Internet.

The payee may receive different types of messages. The payment message may indicate that the transfer of funds has been completed and the payee's personal account has been credited accordingly (in the case of an email transfer between two system account holders). Instead, when the payee does not have an account and the payor requests an email transfer, the payment message may inform the payee that funds have been transferred from the payor's account and are now immediately available to the payee for withdrawal or other transactions. Also, if the payor selects a transfer other than an email transfer, the payee may receive a payment message indicating a wire transfer, a mail delivered check, or an electronic check has been initiated, or that the payee may withdraw cash from a financial institution that is associated with the present invention. In any case, the payee system may then receive the funds and redirect those funds to whomever the payee desires through a selection of different transaction methods. Transactions in accordance with the present invention occur online in real time. Thus, transfer of funds according to the system of the present invention is similar to the exchange of cash between two entities. The payee is informed of the availability of funds and may immediately use the transferred funds towards a purchase, a debit payment, or any other financial transaction.

The present invention provides banking services to individuals and local business communities with the ability to promote commercial links around the world. The present invention provides secure and convenient banking services on the Internet. Banking communications are thoroughly encrypted and supplied with a unique electronic signature to ensure confidentiality and security. Most recent and historic account(s) activity reports may be available to the subscribers of the present invention upon request. Also, subscribers may verify the balance in his or her account(s) at any time. Subscribers may maintain multiple accounts to manage all types of financial transactions, including personal and business related fund transfers. Email transfers, wire transfers, electronic checks, certified checks, conventional checks, Western Union money transfer, and other transaction activities are available. The present invention provides flexible Internet access, secure remote banking tools, multi-currency capability and fast on-line application, processing and management. Users may send cash in minutes throughout the entire world for personal and business reasons.

The present invention simplifies the process of exchanging money for purchases over the Internet. If both the buyer and seller have accounts with a financial institution affiliated with a transfer processing system according to the present invention, funds are transferred from the buyer's account to the seller's account instantly by the transfer processing system(s) and confirmed by the buyer and seller's affiliated financial institutions. In this case, the buyer may access his or her account with the present invention from the seller's web page, complete a form for funds transfer, input the seller's information, and provide an electronic signature to make an instant electronic payment. Also, the buyer may complete an invoice on the seller's web-site, provide the buyer's personal account information of the present invention, and provide an electronic signature to successfully make an electronic payment.

Other objects and advantages of the present invention will be apparent to one of ordinary skill in the art upon reviewing the specification herein.

BRIEF DESCRIPTION OF THE DRAWINGS

FIG. 7a illustrates a screen shot of a graphical user interface for requesting an email transfer where a payee maintains an account with the system according to an embodiment of the present invention.

FIG. 7b illustrates a screen shot of a graphical user interface for requesting an email transfer where a payee does not maintain an account with the system according to an embodiment of the present invention.

FIG. 8a illustrates a screen shot of an email received by a payee according to an embodiment of the present invention.

FIG. 8b illustrates a screen shot of a graphical user interface for accessing funds transferred to a payee according to an embodiment of the present invention.

FIG. 9 illustrates a screen shot of a graphical user interface for requesting a Western Union money transfer according to an embodiment of the present invention.

FIG. 10 illustrates a screen shot of a graphical user interface for requesting a check transfer according to an embodiment of the present invention.

FIGS. 11a and 11b illustrate a screen shot of a graphical user interface for requesting a wire transfer according to an embodiment of the present invention.

DETAILED DESCRIPTION OF THE PREFERRED EMBODIMENTS

Figure 1:
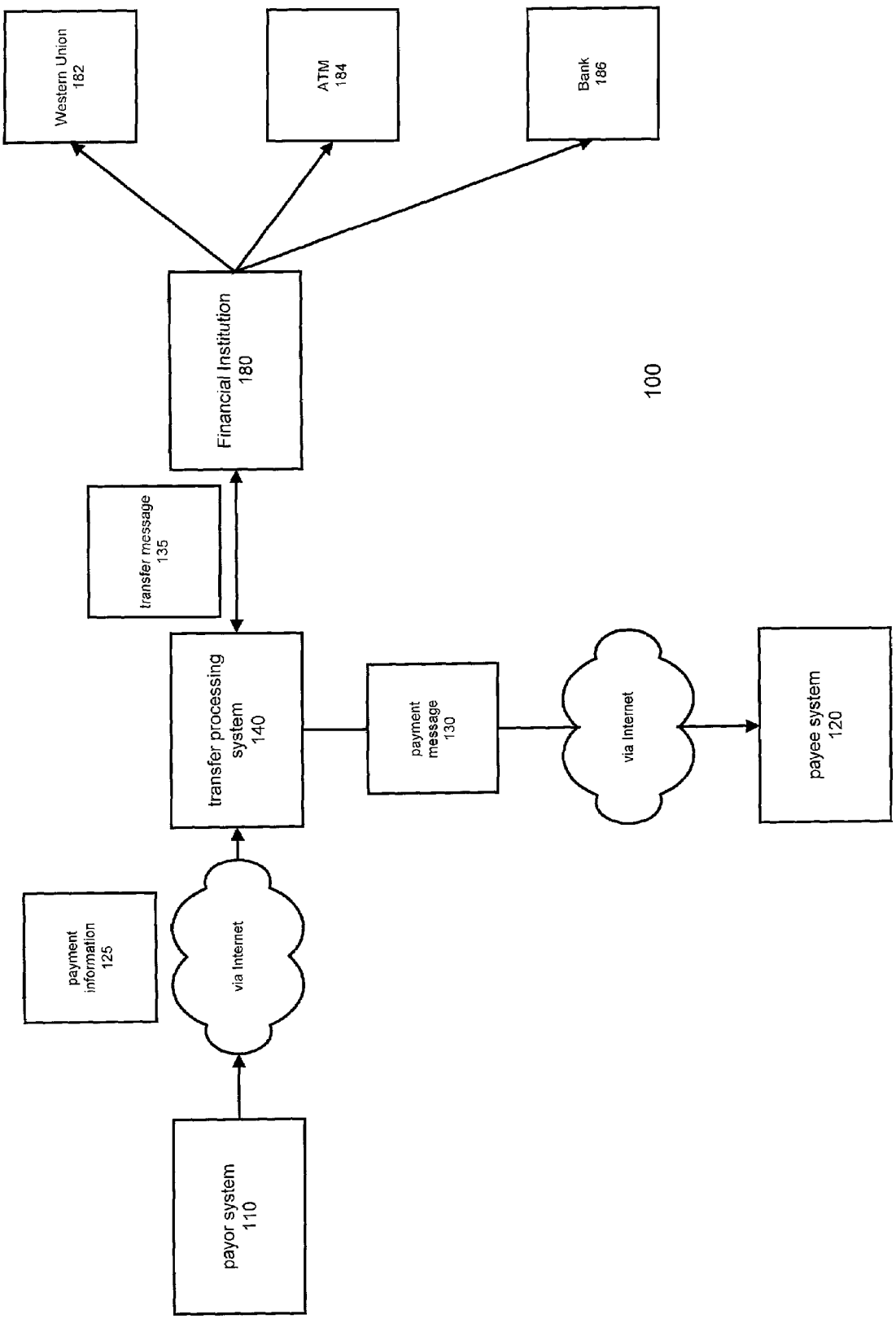
FIG. 1 is a diagram of an overall system of funds transfer where the payor and payee are subscribers to a system according to an embodiment of the present invention.

The present invention relates to methods and systems for transferring funds over the Internet. In these systems and methods, a payor system may provide payment information to a transfer processing system of the present invention to make a funds transfer. That transfer processing system is affiliated with a financial institution wherein a payor's account has been designated for use by the transfer processing system. For purposes of example, the account may be designated as an IBQ™ account so that funds in that account are available for use by an IBQ Server™ (transfer processing system) for on-line money transfers. In a preferred embodiment, each member financial institution has its own IBQ server. Further, each member institution maintains its own account with a Settlement Bank. The Settlement Bank may maintain accounts for all system member banks to settle inter-bank clearance. After verifying that sufficient funds exist in the payor's account, the IBQ server transmits a transfer message to a financial institution and a payment message to the payee system. The transfer message informs the financial institution how much to debit from the payor's account. If the payee system has an account with a financial institution that is a member of the transfer processing system, the transfer message may also inform the financial institution how much to credit the payee's account. This is called an IBQ transfer because both participants are IBQ system customers. The payment message informs the payee system that funds have been transferred and are available.

When the payee receives an electronic payment message from the payor, the payee is informed that funds have been successfully transferred to the payee and are now immediately available. For an IBQ transfer, because the payee has an account with a transfer processing system of the present invention, the payment message unequivocally informs the payee that funds have been transferred to the payee's account at a financial institution that is an IBQ member. An email transfer may also be sent to a payee that does not maintain such an account. For that system, the payee may enter the transfer processing system (IBQ server) through the Internet and easily retrieve the funds transferred from the payor by inputting a password separately provided to the payee by the payor. This method and system of electronic funds transfer provides speed, convenience and security in financial transactions over the Internet.

The funds may be transferred through a plurality of payment methods including an email transfer (described above), wire transfer, electronic check, conventional check, Western Union money transfer, transfer to ATM Debit/Credit cards, letters of credits, buy/sell securities, stop payment orders, and other types of transfers.

The present invention combines electronic messaging and financial transactions into one fast, convenient, affordable, easy-to-use system over the Internet. This combination provides an extremely beneficial system for Internet-based business transactions which require fast transactions and easy accessibility. Transfer of funds according to the present invention may be completed in the normal amount of time it takes for a recipient to receive an electronic message from a sender. Generally, electronic messages are received instantaneously or in a matter of seconds. The speed at which funds are transferred through the system of the present invention is very beneficial for Internet-based transactions world-wide.

The payment information and payment message may be sent via email, AOL Instant Messenger™, NetMeeting™, Microsoft Chat™, ICQ™, Netscape Messenger™ and other methods of electronic communication over the Internet. In addition, a payment message may be sent as a text file to a cell phone or other communication methods so that a recipient may be informed of funds transfer even when access to the Internet is not immediately available. Upon receipt of the payment message by the payee, the payee is assured that the funds have been successfully transferred. Subsequently, the payor may receive confirmation of the transaction.

For example, after negotiations between a merchant and a buyer for goods, the buyer may access the present invention to make a payment for the goods at the agreed price. The buyer may access the present invention and complete a payment order by providing the merchant's email address, the buyer's electronic signature, and possibly other information as well. The specifics of the order may be sent as a text file or as an email message to the merchant with the payment message. If both the merchant and buyer maintain accounts with a participating financial institution according to the present invention, the merchant's account is credited instantly and the goods are on their way to the buyer. If the merchant does not maintain an account with the system, the merchant may easily access the transfer processing system through the Internet (or other methods, if desired) and withdraw the funds transferred by entering security information. The merchant may even redirect the funds received to the merchant's account at a different bank electronically through the system.

The present invention also allows payor systems to transfer funds to a payee system without knowledge of the recipient's account number or anything beyond an email address, chat name, ICQ name and the like. Also, the sender's account number may not be conveyed to the payee system to conduct an electronic funds transaction. This feature of the present invention preserves user security and protects highly confidential information. According to another embodiment, payor and payee personal account numbers may not be disclosed to either user in accessing funds, thereby maintaining the confidentiality of both account numbers. This feature of the present invention applies to the situations where (1) both the payor system and the payee system have accounts with the transfer processing system and (2) only the payor system has an account with the transfer processing system, as well.

More specifically, when both the payor and payee maintain accounts with the present invention, the system provides internal authentication. Security and confidentiality are preserved because the entire funds transfer transaction occurs within the system. Thus, personal account information and passwords are not required to safely transfer funds between two subscriber entities.

When the payee does not maintain an account with the system, a payment control number (PCN) generated by a transfer processing system is conveyed to the payee, such as by including that number as part of the payment message to the payee. To access the funds transferred, the payee enters the transfer processing system, enters that PCN and then enters a password provided by the payor. In one embodiment, the password may be conveyed to the payee through a method of communication that is different from the method used to convey the payment message. For example, the payment message may be sent as an email while the password used to retrieve the funds may be conveyed by telephone, fax, cell phone, a separate email to a different account, or other modes of communication. The non-subscriber payee may then access the transferred funds at the transfer processing system by supplying specifics of the transaction, a reference number, and the password conveyed by the payor.

FIG. 1 is a diagram of an overall system according to the present invention where both the payor system and payee system are account holders of a system of the present invention, as shown by 100 (e.g., IBQ account holders). This figure illustrates an embodiment of the present invention where both payor system 110 and payee system 120 have accounts at financial institution 180 (e.g., IBQ™ accounts) that maintains or is otherwise affiliated with transfer processing system 140

(e.g., an IBQ™ Server). Payor system 110 may enter payment information 125 at transfer processing system 140 through the Internet. Payor system 110 may input payment information 125 at transfer processing system 140 or may send payment information 125 as a packet over the Internet. Transfer processing system 140 verifies that payor system 110 has adequate funds to make the transfer requested. Transfer processing system communicates with financial institution 180 about member accounts so that verification may be established automatically. Payor system 110 may also have access to account information through transfer processing system 140. The payment message 130 is sent to payee system 140 through the Internet while a transfer message 135 is sent to the financial institution 180. Transfer processing system 140 debits and credits payor and payee accounts pursuant to the payor system's payment instructions instantly. Once payee system 120 receives payment message 130, payee system 110 is informed that funds have been successfully transferred from the payor's account to the payee's personal account. At this point, the transfer of funds has been completed and the payee system is assured of proper credit to the payee's account. Payee system 110 may access the funds, transfer the funds to a different entity, or perform other transactions. Depending on the type of funds transfer, once the payee receives the payment message which provides confirmation of funds transfer, payee system 120 may redirect those funds through one or more of the following:

(1) Western Union—The payee may issue a request to have the funds transferred from his or her account to Western Union for cash delivery;

(2) Financial Institution Withdrawal—The payee may withdraw funds in his or her account from his/her member financial institution such as ATM 184, cash withdrawal at the financial institution, additional wire transfers, etc.;

(3) Check issuance—The payee may issue a check from those funds to himself to take to clear at another financial institution; or (4) Other funds related establishments.

Figure 2:
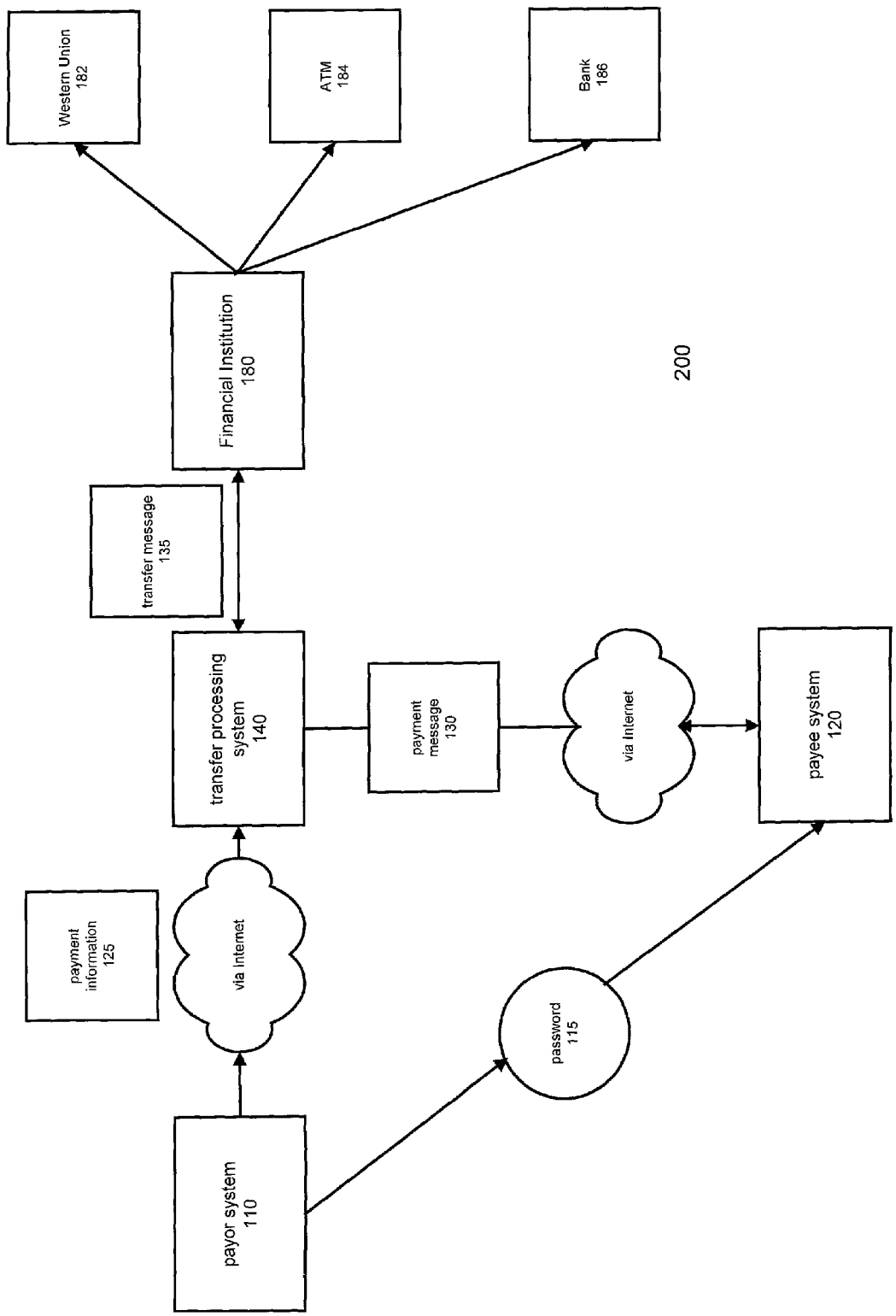
FIG. 2 is a diagram of an overall system of funds transfer where the payee is not a subscriber to the system according to an embodiment of the present invention.

FIG. 2 is a diagram of an overall system 200 according to the present invention where the payee system is not a subscriber of the system of the present invention. This figure illustrates an embodiment of the present invention where payor system 110 maintains an account with financial institution 180 while payee system 120 does not. Payor system 110 may enter payment information 125 directly at transfer processing system 140 through the Internet. Payor may input payment information 125 at transfer processing system or may send payment information 125 as a packet over the Internet. Transfer processing system 140 verifies that payor system 110 has adequate funds to make the transfer requested. Transfer processing system 140 communicates with financial institution 180 about member accounts so that verification may be established automatically. Payor system 110 may also have access to account information through the transfer processing system. Transfer processing system 140 generates a PCN is sent to payee system 140 in payment message 130 through the Internet. A transfer message 135 is sent to a financial institution 180. Transfer processing system 140 debits the payor's account pursuant to the payor system's payment instructions instantly.

Payor system 110 may convey a password 115 to payee system 120 through a separate communication means, such as a telephone, cell phone, fax, an email to a different account, or other mode of communication. By separating the payment message which contains valuable information regarding funds transfer and the password that is needed to actual receive the funds, security is maintained.

In this embodiment, payee system 120 comprises an email address (or other nickname for AOL, ICQ, etc.) enabled device that receives the message. Payee system 120 may then access transfer processing system 140 through the Internet to actually retrieve the funds. To retrieve the funds made available, payee system 120 inputs password 115, the PCN conveyed in the payment message, and specifics of how that payee desires to receive the funds transfer, including Western Union, ATM, forwarding the funds to an IBQ account opened by the payee, etc.

Although these steps are performed to actually retrieve the funds, once payee system 120 receives payment message 130, payee system 110 is informed that funds are immediately available. Payee system may access the funds, transfer the funds to a different entity, or perform other transactions. Depending on the type of funds transfer, once payee receives the payment message which provides confirmation of funds transfer, payee system 120 may access the funds through a Western Union office 182, an ATM 184, or a different bank 186, or other funds related establishments to which funds may be made available for access.

Payment message 130 may be in the form of an email message, a message in a chat room, instant messenger, ICQ, or other similar methods of sending messages over the Internet. Also, payment message 130 may be sent as a text file to a cell phone of the payee system. In these embodiments, the chat program, instant messenger, ICQ, or other modules are IBQ enabled so sending the message also initiates contact with an IBQ server to initiate funds transfer.

Figure 3:
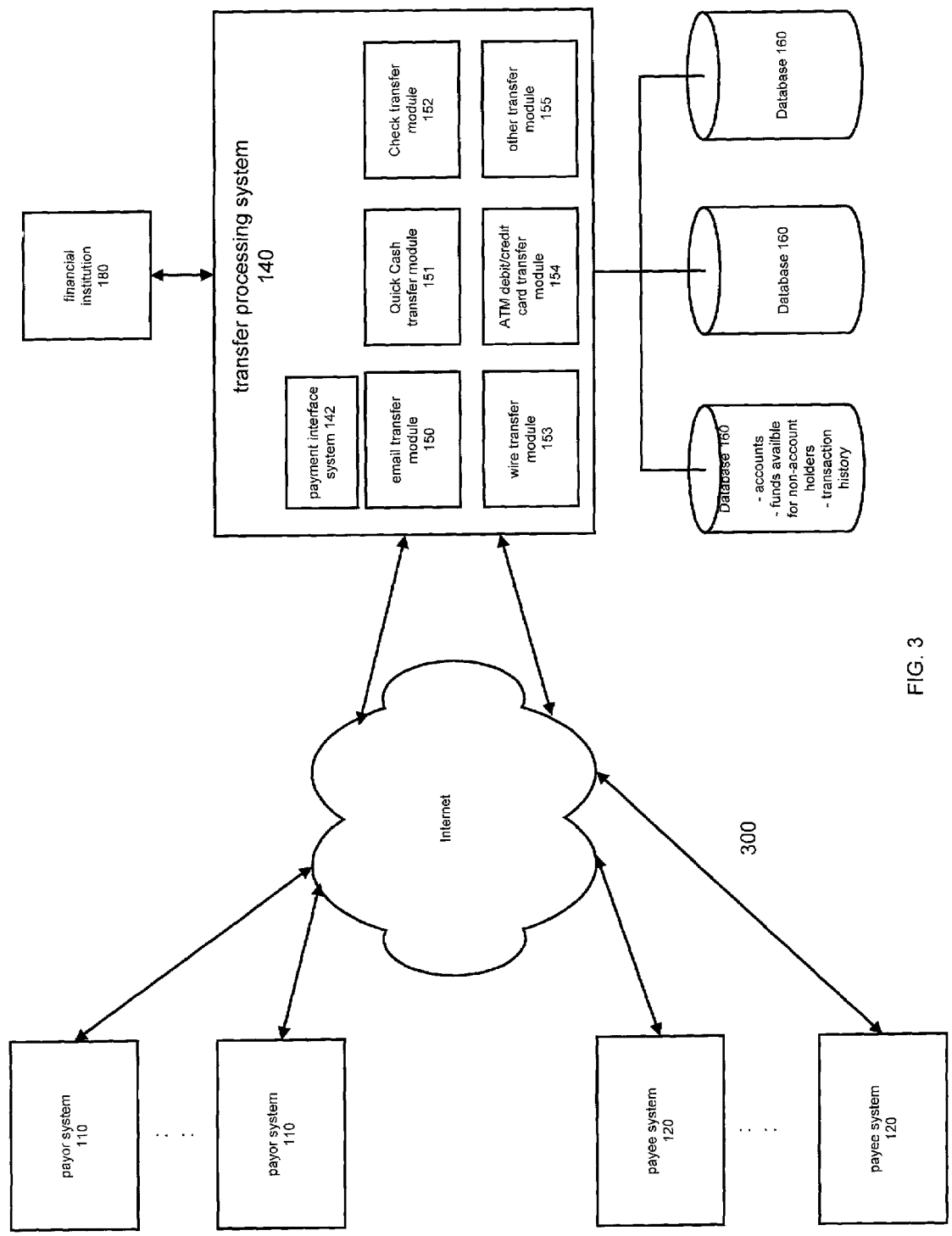
FIG. 3 is a detailed diagram of an overall system for transferring funds over the Internet according to an embodiment of the present invention.

FIG. 3 is a detailed diagram of an overall system according to the present invention, as shown by 300. Payor system 110 may select the type of funds transfer. Funds may be transferred through an email transfer 150, Western Union money transfer 151, check transfer 152, wire transfer 153, ATM debit/credit card transfer 154, and other methods of transferring funds 155, such as letters of credit, buy/sell securities, or stop payment orders. Check transfer module 152 may include electronic checks, certified checks or regular checks. Transfer processing system 140 also provides for a payment interface system 142. One or more payor systems 110 (e.g., user terminals connected over the WWW) are provided that may enter payment information to be processed by transfer processing system 140. Transfer processing system 140 sends a transfer message 135 to financial institution 180 and a payment message 130 to payee system 120. A plurality of payee systems 120 may be provided in system 200. The subscriber's account information, transaction histories, and other relevant information are stored in databases 160 and are accessible by transfer processing system 140. Funds transfer may be realized by either crediting the payee's account at financial institution 180, providing access to the funds via Western Union 182, financial institution withdrawal (e.g., ATM 184), as a check available at a different financial institution 186, or other methods of accessing funds.

For example, if both payor system 110 and payee system 120 are subscribers to transfer processing system 140, the payor's account is debited and the payee's account is credited pursuant to the payor system's instructions instantly. If payor 110 is a subscriber to a member financial institution 180 while payee 120 is not, the payor's IBQ account is debited and those funds are made available to payee system 120. Payee system 120 may then access transfer processing system 140 through the Internet to retrieve the funds transferred by subscriber payor system 110 by entering specific transaction information.

Figure 4:
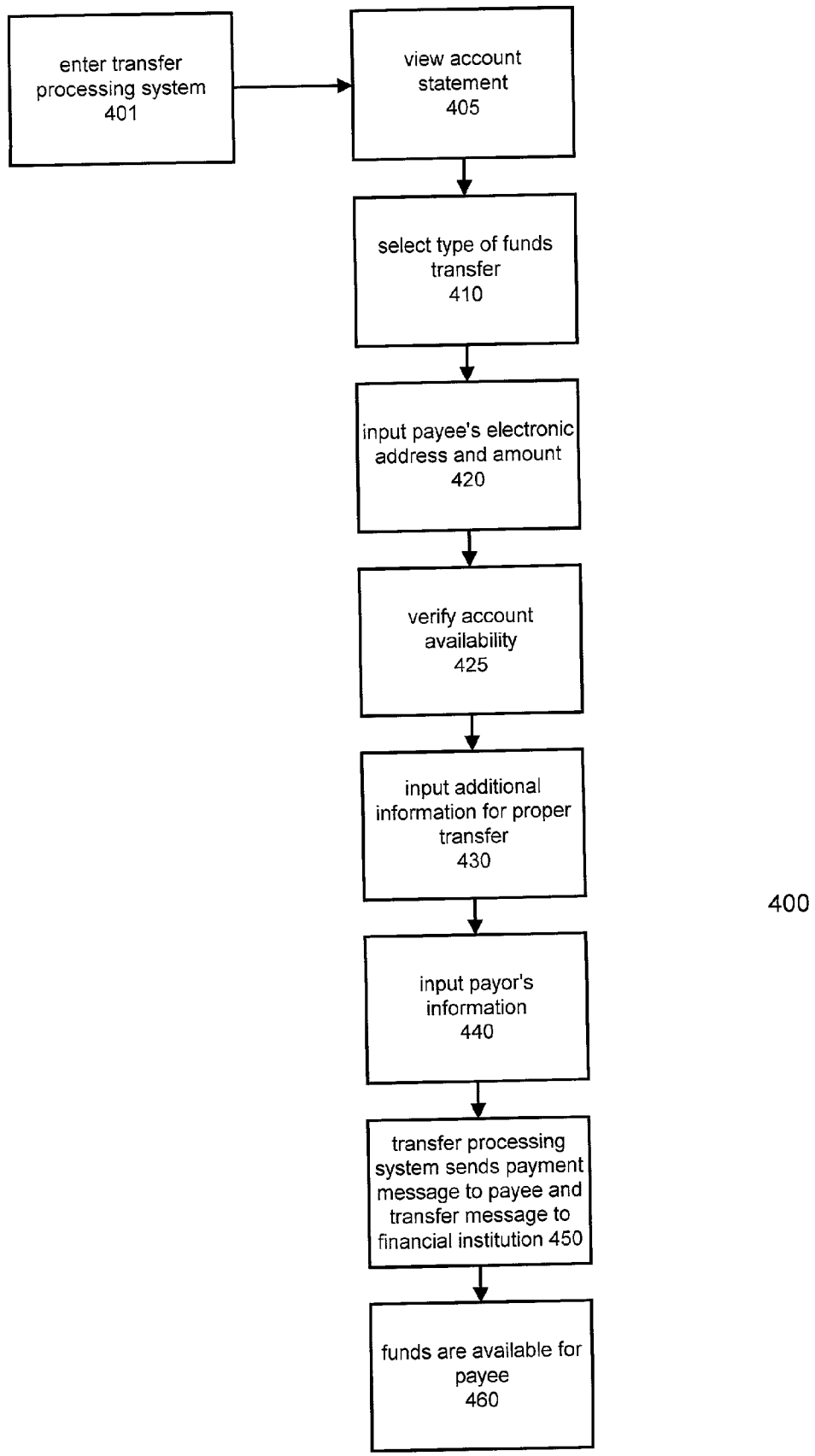
FIG. 4 is a flowchart illustrating a process of electronic funds transfer according to an embodiment of the present invention.

FIG. 4 is a flowchart illustrating a funds transfer method 400 according to an embodiment of the present invention. A payor may enter the transfer processing system through the Internet/WWW at 401. A payor may view his or her account statement to determine whether the desired amount of funds may be transferred, at step 405. The payor may then input information to make a transfer. At step 410, the payor may select a type of funds transfer, which may include email transfer; Western Union money transfer; check transfer (e.g., an electronic check, certified check or regular check); wire transfer; ATM debit/credit card transfer; letters of credit; buy/sell securities; stop payment orders; and other types of transactions. An electronic form corresponding to the desired method of transfer prompts the payor to enter appropriate information specific for each type of transmission. These transactions may occur within the financial institution where both the payor and payee have accounts. Alternatively, the transactions may occur between a payor who has an account with one of the member financial institutions and a payee who does not maintain an account with one of the financial institutions. At step 420, the payor may input the type of currency, amount of transfer and the payee's ID (e.g., electronic address, ICQ name instant messenger address, chat room names, etc.). The transfer processing system may verify the amount available, at step 425. If funds are insufficient for transfer, the system may deny the ability to send instructions for payment. Depending on the type of funds transfer selected, the payor may input additional information for proper transaction, at step 430. The payor may also input his or her information at step 440, which may include an electronic signature, a personal message or other information used by the system to authenticate the payor. The transfer processing system 140 sends a payment message to the payee and a transfer message to a financial institution, at step 450. Finally, the transferred funds are made available for the payee, at step 460.

Figure 5:
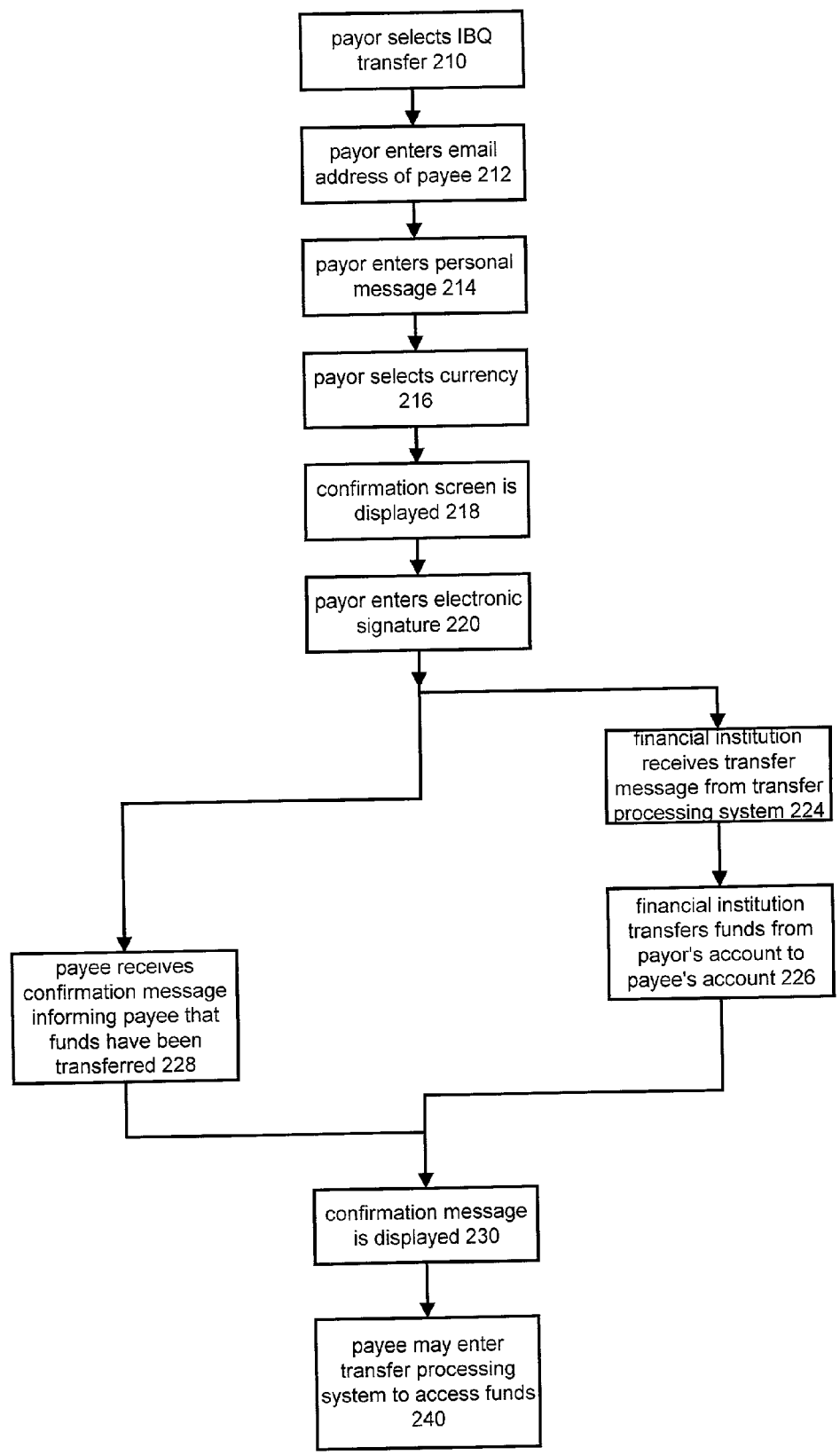
FIG. 5 is a flowchart illustrating a process of electronic funds transfer where both the payor and payee are subscribers of the present invention.

FIG. 5 is a flowchart illustrating a funds transfer method involving a payor and a payee who are both subscribers to the system of the present invention. The subscriber payor may select to send funds to a subscriber payee through an IBQ transfer, at step 210. The subscriber payor may enter the subscriber payee's email address 212, a personal message 214, the type of currency 216, and other relevant information. The subscriber payor may receive a confirmation message at step 218 where an electronic signature may be requested from the payor for verification, at step 220. Where both the payor and payee are subscribers to the present invention, security passwords may be avoided, if desired, because the entire funds transaction occurs within the system of the present invention.

Once a subscriber payor inputs payment information, transfer processing system 140 sends a transfer message to a transfer processing system (see FIG. 13) associated with a financial institution where the payee's account is opened pursuant to the payor's request, at step 224. The funds are directly transferred from the subscriber payor's personal account into the subscriber payee's personal account, at step 226. Simultaneously, the subscriber payee receives a confirmation message from the subscriber payor through the transfer processing system 140 informing the subscriber payee that the funds have been successfully transferred and are now available, at step 228. The subscriber payor may then receive confirmation that the money transfer has been successfully processed, at step 230. The subscriber payee may check the status of the transaction and verify that the funds have been properly transferred by entering the transfer processing system, at step 240. At this point, the subscriber payee may withdraw the funds, redirect the funds, monitor the transaction and perform other related activities. In particular, the payee may make a transfer to a different account within the present invention, order a wire transfer, make a transfer via Western Union money transfer, generate a check, an electronic check or a certified check, make a transfer to an ATM or credit/debit card, or retrieve cash at a bank that subscribes to the present invention.

Figure 6:
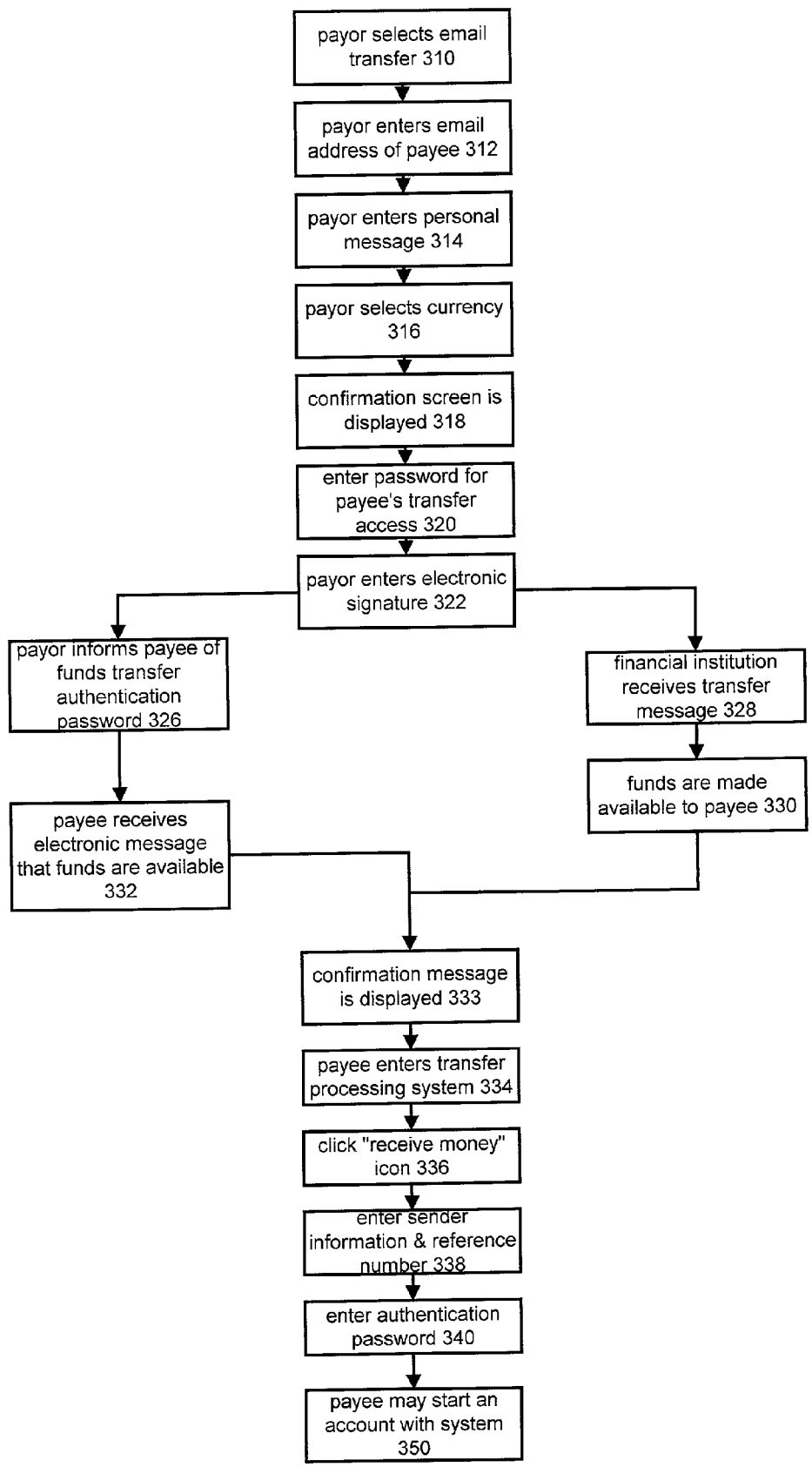
FIG. 6 is a flowchart illustrating a process of electronic funds transfer where the payor is a subscriber of the present invention but the payee is not.

FIG. 6 is a flowchart illustrating a funds transfer method involving a payor who is a subscriber to the system and a payee who is not a subscriber to the system of the present invention. The subscriber payor may select to send funds to a payee through an email transfer, at step 310. The subscriber payor may enter the payee's email address 312, a personal message 314, the type of currency 316, and other relevant information. The subscriber payor may receive a confirmation message at step 318 where an electronic signature may be required for verification, at step 322. In addition, the subscriber payor may enter a password for the payee's transfer access for security purposes, at step 320.

The subscriber payor may inform the payee of the password through a separate method of communication, such as phone, facsimile, a separate email in a different account or other modes of communication to ensure security and confidentiality, at step 326. In one embodiment of the present invention, password is transferred through an alternative channel outside of the system of the present invention. By separating the message indicating funds transfer and the password required to retrieve the funds transferred, security is enhanced because the information to access the funds is not contained in one single message. Although, according to the present invention, the password may be encrypted with the payment message as well or may simply be sent with the message, although doing so may not be entirely secure.

In another embodiment of the present invention, the payor may implement an added security measure. This may include requiring a payor to confirm the transfer before the actual transaction takes place. In this case, the payee sends a message to the payor stating certain confidential information regarding transfer for verification. The payor may then confirm the transaction with his or her personal electronic signature to allow the transaction to actually occur. Thus, the payee provides verification by inputting a reference number and a password provided by the payor while the payor confirms the accuracy of the verification and subsequently permits the transaction to occur.

When the payor inputs payment instructions over the Internet, the transfer processing system sends a transfer message to its financial institution, at step 328. The funds are deducted from the subscriber payor's personal account with the present invention and made available to the payee, at step 330. Simultaneously, the transfer processing system sends a payment message to a payee informing the payee that the funds are available through the present invention, at step 332. The email message may also provide the payor's information, the PCN generated by the transfer processing system, the personal message from the subscriber payor, and instructions for retrieving the money through the present invention. For example, a merchant may convey the details of a particular order for goods or services along with his payment. Also, a merchant may include a file attachment which may include a contract or other documents relating to the purchase of goods or services. The subscriber payor may then receive confirmation that the money transfer has been successfully processed, at step 333. The payee may enter the transfer processing system through the Internet to retrieve the funds made available by the subscriber payor, at step 334. The payee may click on an icon to receive money, at step 336. At this point, the payee may enter the payor's information and the PCN generated by the transfer processing system at step 338, and the authentication password provided by the subscriber payor (e.g., through a separate method of communication, at step 340. The payee may then withdraw the funds, redirect the funds (by opening an IBQ account), monitor the transaction and perform related activities, at step 350. In particular, the payee may make a transfer to an account within the present invention, order a wire transfer, make a transfer via Western Union money transfer, generate a check, an electronic check or a certified check, make a transfer to an ATM or credit/debit card, or retrieve cash at a financial institution that holds a membership to the present invention. The payee may also then monitor the status of those transactions. If desired, the payor may be notified when the payee accesses the funds and/or transfers the funds, opens an account, etc.

If a payee needs the funds quickly, that payee will desire to use the redirect feature because opening an IBQ account may take time. Also, the payee may also desire to remain anonymous to a certain extent with the IBQ system. In that case, the payee is able to redirect the funds held for the payee to case or to an account already established by the payee (e.g., through wire transfer, etc.).

FIGS. 7a and 7b are illustrations of screen shots of graphical user interfaces through which a payor may request an email transfer. The payor may provide an electronic address of the payee. If the payor does not indicate an amount to be transferred, a personal message is sent to the addressee, but no funds are transferred. The present invention functions as an email service if the payor fails to specify an amount to be transferred. The payor may even include file attachments which may include documents, advertisements, or other pertinent information related to business or personal transactions.

For example, Bob Smith may send a payment for lawn services to Joe Jones at Green Lawns, Inc. as detailed in FIG. 7a. Bob Smith may have an account with the present invention with an email address of bobsmith@ibq.com. Bob Smith may send his monthly lawn payment to Joe Jones through an email transfer according to the present invention. Since Bob Smith has an account with the system, his name automatically appears in the "From" line. Bob Smith may enter Joe Jones' email address, a brief description of the transfer in the "Subject" line, a file attachment which may include a document regarding the details of the lawn service, the amount of payment, and a detailed message. Bob Smith may also send a courtesy copy of this email to Joe Jones' senior manager, Ed George. However, payment is entered into GreenLawns' account while Ed George receives a copy of the email message.

If Joe Jones maintains an account under Green Lawns, Inc. with the present invention, Bob Smith may send his payment to greenlawns@ibq.com where receipt of the email message informs Joe Jones at Green Lawns, Inc. that payment has been successfully transferred. If Green Lawns, Inc. does not maintain an account with the present invention, Bob Smith may send the payment to Joe Jones' email address at Green Lawns, Inc. (e.g., joejones@greenlawns.com) as shown in FIG. 7b. Joe Jones of Green Lawns, Inc. may access the funds transferred from Bob Jones, once the payment message is received, through the transfer processing system of the present invention. Instructions regarding the retrieval of funds may be detailed in the payment message sent to Joe Jones through an email, as shown in FIG. 8a, for example. Other methods of communicating instructions may also be used.

FIG. 8a is an illustration of an email message received by a payee upon a funds transfer. The message informs the payee that transferred money may be retrieved from the transaction processing system, such as by accessing a transfer processing system through the Internet according to the present invention. Instructions to retrieve the funds transferred are provided to the payee in the message. The message informs the payee of the payor's name, the payor's email address, and a PCN, which is generated by the transfer processing system, that the payee enters into the transfer processing system to retrieve the funds transferred. Also, the payee receives a personal message sent by the payor through the same system that provides the funds transaction. The payee may provide specifics of an order, specific directions, or other information that may be relevant to the transaction.

The payee does not have to be a subscriber of the present invention to retrieve money. In order to preserve authenticity and security, each message and transaction may be verified through a PCN provided in the electronic message and a password provided by the payor through a separate method of communication. The password may be provided by the payor or generated randomly by the system. Thus, the payee may check on the status of the transaction by inputting the PCN and password. On the other hand, transactions between subscriber payors and subscriber payees are more simple and very secure because each transaction is authenticated and verified within the system. Also, the funds transferred to a subscriber payee are conveniently deposited in the subscriber payee's personal account of the present invention.

For example, Joe Jones of Green Lawns, Inc. may access the web-site of the present invention to access the funds transferred. FIG. 8b illustrates a graphical user interface on the web-site of the present invention which allows a payee who does not have an account with the system to access the funds transferred. In this example, Joe Jones may enter Bob Smith's name and PCN provided by the payment message sent by email (FIG. 8a) and a password given to Joe Jones such as by a separate method of communications (e.g., a phone call, fax, or pager). Joe Jones may then access the money and redirect the payment to Green Lawn's corporate account. Joe Jones may also open an account with the system on behalf of Green Lawn, Inc. to facilitate future transactions through the system.

According to an embodiment of the present invention, the payor may also specify certain limitations when providing the payee the right to withdraw from the payor's account. For example, the payor may specify a time frame for when a payee may exercise his or her rights to access the funds made available to the payee. If the payee fails to exercise this right to the funds transferred by a specified date, the funds may be returned to the original account of the payor.

Although the preferred transfer methods involve an IBQ or email transfer, the IBQ system also enables subscribers to initiate other transfer methods through the web and the IBQ server. An advantage of using the IBQ system to initiate these types of transfers is to allow the initiator to remain anonymous to the payee and to allow the payor to trace the status of each transfer online through the IBQ server. The IBQ server provides the payor with up-to-the-minute status information so the payor knows the exact date and time when the payment is made.

The payor may select to transfer funds to a payee through an email transfer, Western Union money transfer, electronic check, certified check or other types of check, wire transfer, transfer to a debit/credit ATM card, Letter of Credit, Buy/Sell securities, stop payment orders or other methods of funds transfer. An electronic form corresponding to the selected method of transfer prompts the payor to enter appropriate information for proper transmission. Security features may also be enforced to maintain confidentiality. Payors may select the most convenient type of funds transfer based on personal or business preferences which may depend on the type of transaction and preferences of the intended recipient.

One method of transferring money available through the present invention is a Western Union money transfer that provides a fast and reliable method of transferring funds around the world. There is no need to wait for a check to clear or arrive in the mail. Western Union money transfer is an efficient way for payors to access funds from their bank accounts. The transaction is generally completed within a few hours where the transfer may be collected in cash.

As discussed above, FIG. 4 provides an overview of a funds transfer process according to the present invention. With respect to a Western Union money transfer transaction, the payor may input additional information at step 430. FIG. 9 is an illustration of a screen shot of a graphical user interface for a payor to perform to a Western Union money transaction. The payor may enter an electronic address and a personal message. In addition, the payor may enter the name of the individual who retrieves the funds. A destination city, province/state and country may also be specified. Some countries may require a test question so that the individual, designated as the person who picks up the funds, is prompted with the question. Once the proper answer is given, the individual may retrieve the funds.

For example, Karen Brown owns a small card store that sells paper products and greeting cards. Karen Brown may need to transfer funds in the form of a Western Union money transfer to a seller of specialty greeting cards in France. She is late on an important payment and needs to transfer funds quickly and safely. Karen Brown has an account with the present invention and an email address of karenbrown@ibq.com. Karen may attach a document as a file attachment, which may include an invoice detailing the types of greeting cards and the amounts needed by Karen Brown, and a brief personal message. She may send the payment in US dollars and the system converts the funds into the currency of the destination country. In this example, 600 US dollars will be converted into French Francs. Karen Brown may input a question with an answer and relay that answer to Anna so that Anna may receive the transferred funds by inputting the correct answer. Once Anna receives the payment message notifying her of the transfer through Western Union money transfer, Anna may obtain the funds through a participating financial institution, such as a Western Union outlet.

Another method of transferring money available through the present invention is through Check Issuance, which may include the issuance of electronic checks, certified checks, and regular checks. By requesting funds transfer by check issuance, the transfer processing system may prepare the specified type of check and send the check either electronically or by mail. A payor may send a message to a payee indicating that a check was sent or will be sent by either mail or in electronic form.

As discussed above, FIG. 4 provides an overview of a funds transfer process according to an embodiment of the present invention. With respect to a check transaction, the payor may input additional information at step 430. FIG. 10 is an illustration of a screen shot of a graphical user interface for a payor to request a check payment transaction. The payor may enter an electronic address and a personal message. In addition, the payor may enter the name of the entity to which the check is to be issued. An address of the payee and memo explaining the type of transaction or other pertinent information may also be entered. The check is delivered to the mailing address specified by the payor. The method of delivery may also be specified, which may include DHL, UPS, FedEx, EMS, registered mail, or other methods of delivery.

Electronic checks may be used for money transfers in accordance with the present invention. An electronic check may be forwarded as an attachment to the payment message via email. The recipient may access the system and verify the authenticity of the check using a password supplied by the payor, reference number, and other applicable parameters. Also, the payee may print out the electronic check and submit it to a bank with confirmation information to receive payment or make a deposit.

For example, Sam Woods has a restaurant business that is expanding and he wants to redecorate his restaurant to create a more welcoming atmosphere. Sam Woods needs to purchase dining tables (round and square), chairs, a new bar, and ceiling fans. He finds everything he needs through Edgar Bradley Furniture's web-site. Sam Woods wants to purchase these products immediately through the web-site and begin upgrading his restaurant. Sam Woods may send a payment message to Lisa Bradley, the sales representative of Edgar Bradley Furniture, at LisaBradley@EdgarBradley.com. Sam Woods may also specify the exact order, including quantity, color and model as a file attachment. Sam Woods may include the payment and delivery information. Sam Woods also has the option to send this payment as an electronic check or certified check.

Another method of transferring money available through the present invention is through Wire Transfers. Money transferred through a wire transfer may be completed in minutes or may take several days. Generally, wire transfers are commonly used between entities in a business transaction for large amounts of money.

As discussed above, FIG. 4 provides an overview of a funds transfer process according to the present invention. With respect to a wire transfer, the payor may input additional information at step 430. FIGS. 11a and 11b illustrate a screen shot of a graphical user interface for a payor to make a Wire Transfer transaction. The payor may enter an electronic address and a personal message. In addition, the payor may enter information pertaining to an intermediary bank. The payor may also enter information pertaining to a beneficiary bank, which holds the account the payee desires the funds to be transferred. The payor may enter the beneficiary's account information and address. The type of payment may also be specified. For example, the payor may designate the transfer as either urgent or normal. A value date may also be indicated and the payor has the option of requesting confirmation of payment.

For example, Tony Martin is financing a start up company called E-shirts.com that specializes in selling T-shirts over the Internet. The entrepreneurs Dave and Tom are in dire need of money fast. Tony Martin who is a successful businessman wants to wire transfer money to this company. Tony Martin who has an account with a transfer processing system of the present invention may select the wire transfer option and send an email message to Dave&Tom@shirts.com informing them that money is being sent by wire transfer. Tony Martin may also input information regarding the Intermediary Bank and Beneficiary Bank, including details of the wire transfer.

Another method of transferring money available through the present invention is through ATM Credit/Debit Card Transfers where funds are transferred to a card account.

Figure 12:
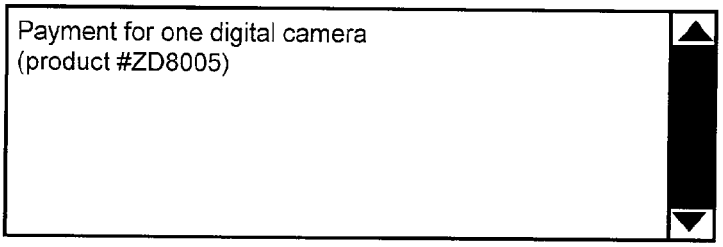
FIG. 12 illustrates a screen shot of a graphical user interface for requesting an ATM credit/debit card transfer according to an embodiment of the present invention.

As discussed above, FIG. 4 provides an overview of a funds transfer process according to the present invention. With respect to an ATM credit/debit transfer, the payor may input additional information at step 430. FIG. 12 is an illustration of a screen shot of a graphical user interface for a payor to make an ATM Credit/Debit transfer transaction. The payor may enter an electronic address and a personal message. In addition, the payor may enter the account number and the card number to conduct an ATM credit/debit card transfer.

For example, Sue Parker may purchase a digital camera from Mike at CameraShop.com over the Internet through a payment to her ATM Credit Card. Sue Parker may send a payment message by email to Mike where the payment message is simultaneously sent to a transfer processing system. Mike may have an account with the present invention with an email address of CameraShop@ibq.com. The payment message provides instructions to debit Sue Parker's ATM Credit Card and transfer these funds to CameraShop.com's account with the system. Sue Parker provides the system with her account number and card number. When the payment message is sent, her account is debited immediately and her order for a digital camera is processed. If CameraShop.com maintains an account with the present invention, the payment for the digital camera is immediately transferred into CameraShop.com's account thereby facilitating payment.

Each user who maintains an account with a transfer processing system of the present invention may receive a unique email address. Email messages may be signed with a secret code or electronic signature for authentication purposes. For confidentiality reasons, some users may prefer to remain anonymous. This may be accomplished by using an email address that does not reveal anything about the user's name or personality, such as a series of random numbers. Users may send and receive email via the Internet, send and receive secure mail to the transfer processing system, send and receive secure communications with other users, send out invitations to other non-members to join the system, and send out special instructions explaining how to make payments to accounts maintained by the system and how to receive funds from users of the system.

The system of the present invention enables payees to receive money to an email or postal address whether the recipient has an account with the system or not. The payor may enter the system and complete a payment message addressed to the recipient. The payor may provide the recipient's name and the recipient's email or postal address. The payment message informs the recipient of payment through email or regular mail. This message may include detailed instructions on how to verify the authenticity of the payment message and how to access the funds available to the recipient. This payment message simultaneously serves as funds transfer instructions to the bank. The payment message may be electronically signed and forwarded to a transfer processing system where the payor's account is debited accordingly.

Once the recipient is notified of the transfer of funds, the recipient may access the funds through the transfer processing system using a reference number provided by the payment message and a password provided by the payor. The payment message gives the recipient the right to access the funds (held in route) which are made available to the recipient by the sender. The payor may specify the time frame at which the recipient may exercise this right of withdrawal. Thus, the recipient is informing the system of the particulars of the transfer (such as, reference number and password) and the sender is confirming the accuracy of the request and allows the transaction to occur. Once the recipient has accessed the funds, the recipient may make a transfer to a system account, order a wire transfer, make a transfer via Western Union money transfer, generate a certified check, electronic check or regular check, make a transfer to an ATM or credit/debit card, or receive cash at a bank or transfer processing system that has an account with the present invention.

Senders may send payment messages to subscriber payees and non-subscriber payees. Once the non-subscriber payee enters the system and accesses the funds, the non-subscriber payee may register with the system and open a personal account where the funds accessed may be immediately deposited. The payee is also given a personal email account with the system. This payee who is now a subscriber of the system may send input payment instructions at a transfer processing system for funds transfers to other individuals or entities.

Another feature of the present invention is the anonymity at which funds may be transferred. Users may select email addresses that do not disclose anything about the user's name or affiliation with a group or company. For example, a user may send and receive funds using an email address comprising random numbers to preserve the user's confidentiality. Local banking laws may require the IBQ subscriber to provide information to the financial institution, but only the email address is sent to the payee if the payor so desires. Moreover, the payee may maintain anonymity as well because only an email address may be used at which to receive funds, when they are redirected to another form of payment.

Subscriber payors may invite a potential recipient, who is not a subscriber to the present invention, to become a member of the transfer processing system before the payor actually makes a transfer of funds. The payor may enter the system and provide the potential recipient's information so that the system may issue an invitation to join the system. Once the payor obtains an IBQ account with the system, the payee may instantly transfer funds to the payee's IBQ account. Thus, the potential payee becomes a member of the system before the payor transfer the funds. The payor may now transfer the funds to the payee's account with the system for a instant transaction.

Alternatively, a subscriber payor may send a payment message to a non-subscriber payee. Once the payment message is processed and received, the payee may access a transfer processing system to retrieve the funds transferred. At this point, the payee may open an account with the transfer processing system. The funds that are available to the payee may be immediately transferred into the payee's newly opened account with the system. Now, the payee may transfer funds to other subscribers or non-subscribers of the system. The system of the present invention may compensate the subscriber through financial compensation or by providing additional services to the payor for each invitation that is accepted by potential payees. Also, the financial institution and IBQ system may enter into a business arrangement whereby compensation is exchanged based on new customers. Because accessing IBQ funds provides an incentive to open an account with a member institution, the IBQ system may be paid by the financial institution for each new customer. The compensation may be a flat fee, may be based on a percentage of the deposit, may be based on a percentage of transaction fees generated or any other shared risk compensation structure.

Another option available to the payee is the ability to redirect the funds received from the payor. The payee may redirect the funds to another bank or credit account(s). To initiate this feature, the payee may complete an order requesting the redirection of funds. A notice of confirmation may be sent to the original payor for confirmation. In addition, an electronic signature of the original payor may be required. The request for redirection may then be processed and completed. Redirection of funds may be useful for business and personal transactions. For example, a buyer may transfer funds to a seller in exchange for goods. Once the buyer receives notice of the transfer of funds, the buyer may redirect all or a portion of these funds to the manufacturer of goods as payment for the goods. In another example, an individual may receive funds through a business deal by the present invention. This individual may then redirect the funds received to his or her creditors to remain in business.

Figure 13:
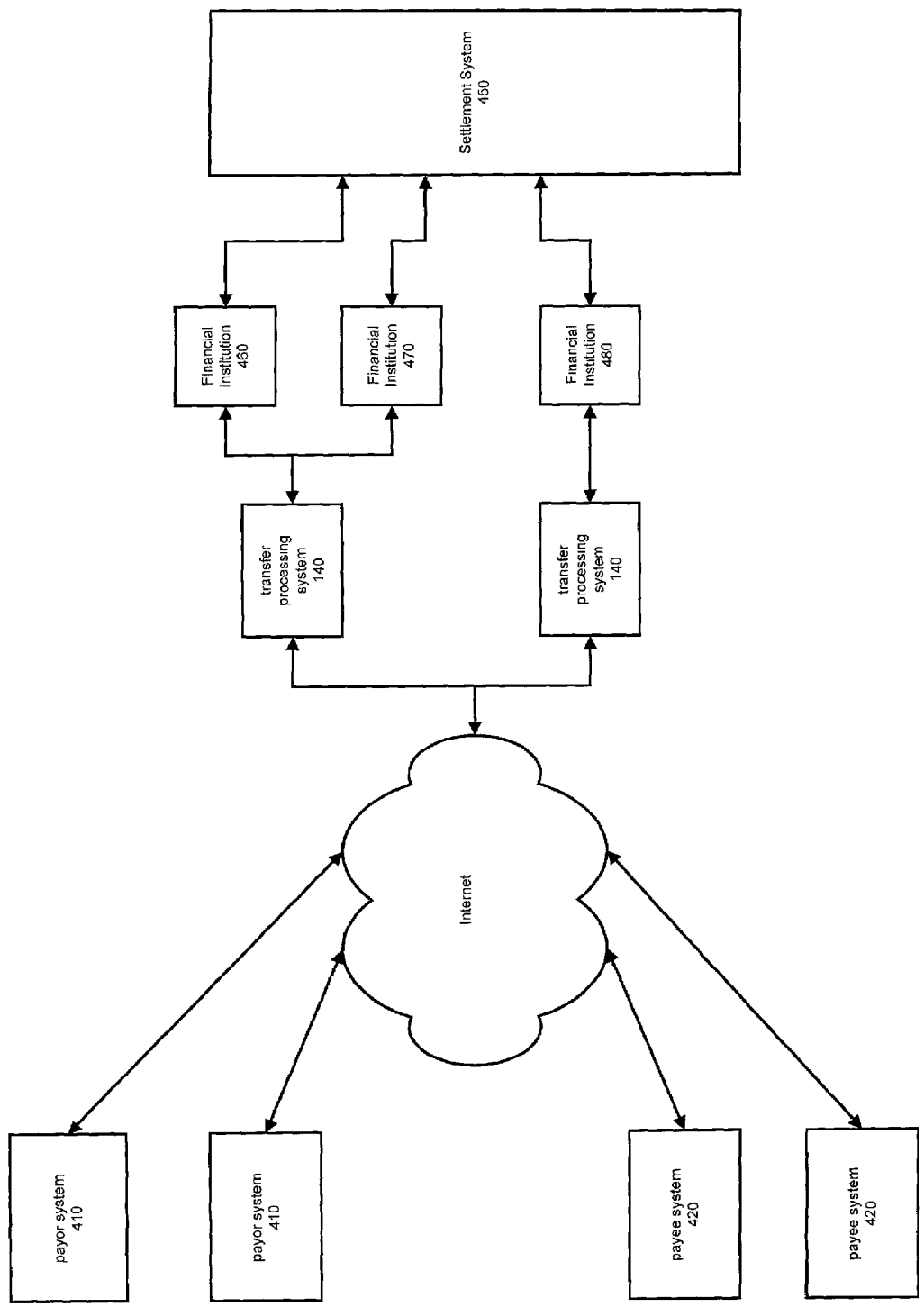
FIG. 13 is a diagram of a system where clients of different processing systems transfer funds according to an embodiment of the present invention.

FIG. 13 is a diagram of a system where transfers occur between clients of different financial institutions as affiliates of different transfer processing systems according to an embodiment of the present invention. This feature of the present invention provides funds transfer between clients of different transfer processing systems in a fast and convenient manner. Settlement system 450 maintains a network of agreements with different financial institutions (460, 470, 480) (which perform as financial institutions 180 described above) and their clients for settling funds transfers between different banks through the Internet. Payor system 410 may send payment information to a transfer processing system. The transfer processing system sends a transfer message to the appropriate financial institution and a payment message to payee system 420, which may be in the form of an email or other mode of communication. The payment message is received by settlement system 450 so that the funds from the payor system's account maintained in financial institution 460 is debited and the payee system's account maintained in a different financial institution 470 is credited pursuant to payor system's payment instruction. Because the payee system 420 also maintains an account that is maintained by settlement system 450, payee system 420 receives payment immediately. The payee system does not have to maintain an account that is maintained by settlement system 450. In this case, the funds transferred by the payor system to a non-member payee system are made available to the payee system through connection with the settlement system. Settlement system 450 is also responsible for maintaining and providing communication channels and systems via the Internet to clients of various banks. Thus, fast and convenient funds transfer is provided by the present invention with minimum transaction costs.

For example, Bill Roberts may have an account with financial institution 460 in Germany while Mike Yojihama may have an account with financial institution 470 in Japan. Bill and Mike are partners in an on-line audio visual equipment store. Bill who manages the company in Germany needs to transfer funds to Mike who purchases technical equipment from Japan. Bill may send a payment message via email to Mike through the present invention where the payment message informs Mike of the details of the transfer. When Mike receives this payment message, Mike is assured that the funds have been transferred into his account the financial institution where his IBQ account exists and may be used to pay wholesalers in Japan for audio visual equipment.

The present invention may be particularly useful for e-commerce transactions. More and more web-sites are selling goods and services over the Internet. This includes the sale of cars, books, jewelry, clothing, various services, information, and anything else that may be sold for a price. Purchases over the Internet are convenient, economical, and quick. Auction-type services on the Internet have also gained more popularity and general acceptance. The speed at which transactions occur is especially critical in auction-type transactions where time is of the essence. If the potential purchaser is delayed in transferring the funds, the purchaser may lose the opportunity to purchase the product or may have to offer an even higher bid. Transferring funds in accordance with the present invention may be completed instantly when both parties are members of a transfer processing system. The buyer may access his or her account with the present invention from the seller's web page, complete a form for funds transfer, input the seller's information, and provide an electronic signature to make an immediate electronic payment. Alternatively, the buyer may complete an invoice on the seller's web page, provide the buyer's personal account information of the present invention, and provide an electronic signature to complete an electronic payment.

Financial institutions that are members of a settlement system may open system accounts for their clients in accordance with local banking laws. This is important for world-wide funds transfer to different countries with different banking laws. For example, a resident of Germany may open an account with a financial institution in Germany according to those banking laws and regulations. Financial institutions located in different countries may establish relationships through a settlement system for world-wide funds transfer. Financial institutions that are members of the settlement system gain access to an enormous customer base, receive commission from each transaction, and gain expansive use of the Internet through funds transactions.

Another feature of the present invention is the ability to send funds in a different currency. This is particularly important for international funds transfer. Through the use of the Internet, business transactions are expanding more rapidly into world wide transactions. The present invention simplifies the task of converting funds into different currency by automating the process. Payors may conveniently make payments to individuals and corporations in foreign countries.

Another feature of the present invention is the ability to invite non subscribers to join the system of the present invention when a subscriber payor sends an electronic message informing a non subscriber payee that funds have been transferred and are now available. This feature of the present invention provides a useful marketing tool in reaching potential subscribers by targeting individuals who need to access the present invention in order to retrieve funds transferred to them. Another method of reaching new subscribers involves a subscriber providing a list of email addresses of potential subscribers.

The present invention also provides the ability to inform payees of funds transfer through other modes of communication, such as cell phones and pagers. This allows the payee to receive information of funds transfer immediately and at the payee's most convenient method of receiving information. Therefore, the payee may be informed of funds transfer even when the payee does not have immediate access to a computer.

The present invention also provides the ability to sends payment message through private chat rooms, AOL Instant Messenger, NetMeeting, Microsoft Chat, ICQ, Netscape Messenger and other similar electronic methods of communication. Thus, funds may be instantly transferred while the payor and payee are conversing over an electronic medium. This feature may facilitate negotiations and transactions between business entities.

The present invention provides many services with respect to sending funds from an account with the system. For example, senders may transfer funds to other recipients having accounts with the system. Senders may transfer funds to an email address to a recipient who does not have an account with the system where the intended recipient may be invited to join the system, informed of funds transfer, receives a password through an alternative communication method to access and receive the transferred funds and receives instructions for funds retrieval. The sender may also issue an order for a check where transfer processing system prepares and mails a regular or certified check by mail or may issue an electronic check. The sender may even issue an order for a wire transfer, send a transfer via Western Union money transfer where the transfer is collected in cash, or transfer money to an ATM credit/debit card where the transfer is made to a card account.

Individuals receiving transferred funds are also entitled to many services through the present invention. For example, the recipient may receive a transfer from another system account or a money transfer. Recipients may also collect payments through a debit/credit card or deposit a check in the recipient's personal account.

Cash withdrawals are also provided by the system of the present invention through an ATM credit/debit card, via Western Union money transfer, or cash withdrawals at a member bank. In addition, users may transfer funds through letters of credit, buy/sell securities and may also issue stop payment orders.

One time money transfer are also available through the present invention. In particular, the system allows a single money transfer without requiring an account with the system. Non-account holders may participate in money transfers through authorized transfer processing systems.

Other embodiments and uses of the invention will be apparent to those skilled in the art from consideration of the specification and practice of the invention disclosed herein. The specification and examples should be considered exemplary only.

What is claimed is:

1. A method for transferring funds over the Internet comprising the steps of:
    receiving via the Internet at a transfer processing system that has access to funds from a payor account an electronic message that contains fund transfer information, the fund transfer information comprising a fund transfer amount and an electronic address for the payee;
    initiating transfer of funds from the payor account to the payee at the transfer processing system by accessing the funds in a payor account, wherein the funds may be transferred to either a payee account or a holding account based on whether the payee account is available to the transfer processing system;
    wherein the initiating step comprises the following:
        if a payee account associated with the electronic address for the payee provided in the electronic message is accessible to the transfer processing system, then initiating transfer of funds from the payor account to the payee account associated with the electronic address for the payee; and
        if a payee account is not available to the transfer processing system and an email type transfer is requested, then initiating transfer of funds from the payor account into a holding account associated with the electronic address of the payee; and
    simultaneously with the initiation step, transmitting a payment message over the Internet to the payee's electronic address from the transfer processing system, the payment message containing information that confirms to the payee that the payor has made funds available to the payee.

2. The method of claim 1 further comprising the step of enabling the payee to access the funds transferred.

3. The method of claim 1 wherein the payment message comprises a reference to the holding account to enable the payee to access the funds in the holding account.

4. The method of claim 3 further comprising the step of enabling the payee to connect to the transfer processing system over the Internet to input the reference to establish a payee account.

5. The method of claim 3 further comprising the step of enabling the payee to connect to the transfer processing system over the Internet to input the reference to transfer the funds from the holding account into another fund account.

6. The method of claim 5 wherein the fund account comprises a cash delivery service account.

7. The method of claim 1 wherein further comprising the step of:
    communicating an authentication key to the payee; and
    enabling the payee to access funds in the holding account upon entry of the authentication key.

8. The method of claim 7 wherein the payment message comprises a reference to the holding account to enable the payee to access the funds in the holding account and wherein the payee enters the reference and the authentication key to access the funds.

9. The method of claim 1 wherein the payment message is transmitted through email.

10. The method of claim 1 wherein the payment message is transmitted through an instant messenger system.

11. The method of claim 1 wherein the payment message is transmitted to a chat room participant.

12. The method of claim 1 wherein the fund transfer information comprises information for making a wire transfer and wherein the step of initiating transfer of funds transmits a wire transfer request for transferring funds from the payor account to an account specified in the fund transfer information.

13. The method of claim 12 wherein the payment message informs the payee that the wire transfer has been initiated from the payor to a specified account.

14. The method of claim 1 wherein the fund transfer information comprises information for generating a check and wherein the step of initiating transfer of funds transmits a request to generate a check from the payor account to a payee specified in the fund transfer information.

15. The method of claim 14 wherein the fund transfer information comprises information for generating an electronic check and wherein the payment message includes the electronic check.

16. The method of claim 1 wherein the fund transfer information comprises information for making a cash delivery service transfer and wherein the step of initiating transfer of funds transmits a request for transferring funds from the payor account to a cash delivery service where the payee may receive the funds.

17. The method of claim 1 wherein the fund transfer information comprises information for making a transfer to an ATM/credit card and wherein the step of initiating transfer of funds transmits a request for transferring funds from the payor account to an ATM/credit card.

18. The method of claim 1, further comprising:
    prior to initiating transfer of funds, determining whether a payee account is available to the transfer processing system.

19. A system for transferring funds over the Internet comprising:
    fund transfer information receiving means for receiving an electronic message over the Internet that contains fund transfer information, the fund transfer information comprising a fund transfer amount, a fund transfer type and an electronic address for the payee;
    fund transfer information parsing means for parsing the electronic message to generate a transfer message to transfer funds from the payor account to the payee and to generate a payment message containing information to confirm to the payee that the payor has made funds available;

wherein if the fund transfer type is an email transfer and if the transfer processing system has a payee account associated with the electronic address, then the transfer message specifies a payee account associated with the electronic address for the payee into which the funds are to be transferred from the payor account; and wherein if the fund transfer type is an email transfer and if the transfer processing system does not have a payee account associated with the electronic address, then the transfer message specifies the electronic address of the payee for association with a holding account into which the funds are to be transferred;

wherein if the fund transfer type is a type other than an email transfer, then the transfer message specifies the details of the transfer to be executed to make the funds available to the payee; and payment message transmission means for transmitting the payment message to the payee at the electronic address specified.

20. The system of claim 19 further comprising fund access means for enabling the payee to access the funds.

21. The system of claim 19 wherein the transfer message includes instructions to transfer funds from the payor account to a payee account accessible by the transfer processing system.

22. The system of claim 19 wherein if the transfer type is an email and the payee does not have a payee account, then the payment message comprises a reference to the holding account to enable the payee to access the funds in the holding account.

23. The system of claim 22 further comprising payee interface means for enabling a payee to connect over the Internet to input the reference to transfer the funds from the holding account into another fund account.

24. The system of claim 23 wherein the fund account comprises a cash delivery service account.

25. The system of claim 23 wherein the payee enters an authentication key provided by the payor to the payee to access funds in the holding account.

26. The system of claim 19 further comprising payee interface means for enabling a payee to connect over the Internet to input the reference to establish a payee account.

27. The system of claim 19 wherein the payment message transmission means comprises an email server.

28. The system of claim 19 wherein the payment message transmission means comprises an instant messenger system.

29. The system of claim 19 wherein the payment message transmission means comprises a chat room server.

30. The system of claim 19 wherein the fund transfer type comprises a wire transfer type and the fund transfer information comprises information for making a wire transfer and further comprising wire transfer means for transferring funds via wire transfer from the payor account to an account specified in the fund transfer information.

31. The system of claim 30 wherein the payment message informs the payee that the wire transfer has been initiated from the payor to a specified account.

32. The system of claim 19 wherein the fund transfer type comprises a check generation transfer and the fund transfer information comprises information for generating a check and further comprising check generation means for generating a check from the payor account to a payee specified in the fund transfer information.

33. The system of claim 32 wherein the fund transfer information comprises information for generating an electronic check and wherein the check generation means generates an electronic check which is included in the payment message.

34. The system of claim 19 wherein the fund transfer type comprises a cash delivery transfer and the fund transfer information comprises information for making a cash delivery service transfer and further comprising cash delivery service transfer means for transferring funds from the payor account to a cash delivery service where the payee may receive the funds.

35. The system of claim 19 wherein the fund transfer type comprises a ATM/credit card transfer and the fund transfer information comprises information for making a transfer to an ATM/credit card and further comprising ATM/credit card transfer means for transferring funds from the payor account to an ATM/credit card account.

36. A method of transferring funds over the Internet anonymously to an electronic address, the method comprising the steps of:

enabling a payor to input fund transfer information over the Internet to a transfer processing system, the fund transfer information comprising payor account information regarding an account accessible by the transfer processing system, a fund transfer amount information and an electronic address for the payee, wherein the electronic address does not identify the payee;

transferring funds from the payor account into a holding account and assigning a payment control number to the payment;

transmitting the payment control number to the electronic address to enable a user that receives the reference number to access the funds in the holding account.

37. The method of claim 36 wherein the reference number does not identify the identity of the payor or the payor's account information.

38. The method of claim 36 further comprising the step of: communicating an authentication key to a payee and wherein the user inputs the reference number and authentication key to access the funds in the holding account.

39. The method of claim 38 wherein the authentication key is a password.

40. A system for transferring funds over the Internet anonymously to an electronic address comprising:

fund transfer information receiving means for receiving fund transfer information over the Internet, the fund transfer information comprising payor account information regarding an account accessible by the transfer processing system, a fund transfer amount information and an electronic address for the payee, wherein the electronic address does not identify the payee;

transfer means for transferring funds from the payor account into a holding account and assigning a reference number to the account;

reference number transmission means for transmitting the reference number to the electronic address to enable a user that receives the reference number to access the funds in the holding account.

41. The system of claim 40 wherein the reference number does not identify the identity of the payor or the payor's account information.

42. The system of claim 40 further comprising wherein the user inputs the reference number and an authentication key provided by the payor to access the funds in the holding account.

43. The system of claim 42 wherein the authentication key is a password.

44. A method for transferring funds over the Internet comprising the steps of:

receiving via the Internet at a transfer processing system that has access to funds from a payor account an electronic message that contains fund transfer information, the fund transfer information comprising a fund transfer amount and an electronic address for the payee;

initiating transfer of funds from the payor account to the payee at the transfer processing system by accessing the funds in a payor account, wherein the act of initiating transfer of funds comprises initiating transfer of funds from the payor account into a holding account associated with the electronic address of the payee, wherein a payee account is not available to the transfer processing system and an email type transfer is requested; and simultaneously with the initiation step, transmitting a payment message over the Internet to the payee's electronic address from the transfer processing system, the payment message containing information that confirms to the payee that the payor has made funds available to the payee.

\* \* \* \* \*

UNITED STATES PATENT AND TRADEMARK OFFICE
CERTIFICATE OF CORRECTION

PATENT NO. : 7,644,037 B1
APPLICATION NO. : 09/524281
DATED : January 5, 2010
INVENTOR(S) : Ostrovsky Page 1 of 1

It is certified that error appears in the above-identified patent and that said Letters Patent is hereby corrected as shown below:

On Title Page

Please add the following Item (60):

"Provisional Application No. 60/164,274, filed November 9, 1999, 60/148,698, filed August 16, 1999."

Signed and Sealed this
Third Day of May, 2011

David J. Kappos
*Director of the United States Patent and Trademark Office*